(12) United States Patent
Zhang et al.

(10) Patent No.: US 12,325,808 B2
(45) Date of Patent: Jun. 10, 2025

(54) SUPERHYDROPHOBIC COATING WITH ABRASION RESISTANCE AND PREPARATION METHOD THEREOF

(71) Applicant: University of Science and Technology Beijing, Beijing (CN)

(72) Inventors: Dawei Zhang, Beijing (CN); Lingwei Ma, Beijing (CN); Fan Zhang, Beijing (CN); Di Xu, Beijing (CN); Jinke Wang, Beijing (CN); Yao Huang, Beijing (CN); Xiaogang Li, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 833 days.

(21) Appl. No.: 17/519,188

(22) Filed: Nov. 4, 2021

(65) Prior Publication Data
US 2022/0315772 A1    Oct. 6, 2022

(30) Foreign Application Priority Data
Mar. 30, 2021    (CN) .......................... 202110343583.8

(51) Int. Cl.
| | |
|---|---|
| C09D 5/16 | (2006.01) |
| C01B 32/168 | (2017.01) |
| C01B 33/12 | (2006.01) |
| C09D 7/40 | (2018.01) |
| C09D 7/61 | (2018.01) |
| C09D 7/80 | (2018.01) |
| B82Y 30/00 | (2011.01) |
| B82Y 40/00 | (2011.01) |

(52) U.S. Cl.
CPC .......... *C09D 5/1618* (2013.01); *C01B 32/168* (2017.08); *C01B 33/12* (2013.01); *C09D 5/1681* (2013.01); *C09D 7/61* (2018.01); *C09D 7/67* (2018.01); *C09D 7/68* (2018.01); *C09D 7/80* (2018.01); *B82Y 30/00* (2013.01); *B82Y 40/00* (2013.01); *C01B 2202/06* (2013.01); *C01B 2202/26* (2013.01); *C01P 2004/03* (2013.01); *C01P 2004/04* (2013.01); *C01P 2004/133* (2013.01); *C01P 2004/62* (2013.01); *C01P 2004/64* (2013.01); *C01P 2006/90* (2013.01)

(58) Field of Classification Search
CPC .......... C01B 33/12; C01B 32/168; B05D 1/02
See application file for complete search history.

(56) References Cited

U.S. PATENT DOCUMENTS

| | | | | |
|---|---|---|---|---|
| 2009/0298369 | A1* | 12/2009 | Koene ................. | D06M 15/564 523/213 |
| 2014/0087134 | A1* | 3/2014 | Gesford ............... | C09D 175/04 428/141 |
| 2017/0190139 | A1* | 7/2017 | Haghdoost ............... | B32B 3/18 |

* cited by examiner

*Primary Examiner* — Dah-Wei D. Yuan
*Assistant Examiner* — Kristen A Dagenais
(74) *Attorney, Agent, or Firm* — Fish IP Law, LLP

(57) ABSTRACT

Disclosed are a superhydrophobic coating with abrasion resistance and a preparation method thereof. The coating has a composite structure formed by a nanohybrid composed of nano-$SiO_2$ and multi-wallet carbon nanotubes, and a resin as a matrix.

1 Claim, 5 Drawing Sheets

SUPERHYDROPHOBIC COATING WITH ABRASION RESISTANCE AND PREPARATION METHOD THEREOF

CROSS REFERENCE TO RELATED APPLICATION

This application claims the benefit and priority of Chinese Patent Application No. 202110343583.8 filed on Mar. 30, 2021, the disclosure of which is incorporated by reference herein in its entirety as part of the present application.

CROSS REFERENCE TO RELATED APPLICATION

This application claims the benefit and priority of Chinese Patent Application No. 202110343583.8 file on Mar. 30, 2021, the disclosure of which is incorporated by reference herein in its entirety as part of the present application.

TECHNICAL FIELD

The present disclosure relates to a superhydrophobic coating with abrasion resistance and a preparation method thereof, and belongs to the technical field of micro/nano-materials.

BACKGROUND ART

Inspired by "bionics", superhydrophobic surfaces have attracted extensive attention. The application of superhydrophobic surfaces in the field of corrosion protection of metals is a vital breakthrough. In the application, the surface hydrophobicity of a metal material can be improved to effectively prevent the surface of the metal material from corrosion by water or corrosive ions and reduce the corrosion rate of the metal, thus prolonging the service life of the metal material. However, coatings will undergo physical damages such as abrasion by sand and stone and artificially imposed squeezing during service, resulting in a decreased hydrophobicity. Coating damage makes the corrosive medium easy to contact with the metal substrate, thus leading to a reduced anti-corrosion performance. Therefore, it is urgently necessary to develop a superhydrophobic coating with excellent abrasion resistance.

A coating with superhydrophobicity and abrasion resistance surface could be obtained by preparing a composite coating with a micro-/nano-structured surface and then improving the surface roughness of the coating. Existing methods for improving the surface roughness of the coating include a chemical conversion coating method, an etching method, a hydrothermal method, an anodic oxidation method, an electrodeposition method, a sol-gel method, a template method, a nano-composite coating method and so on. Among others, the method for preparing an abrasion-resistant superhydrophobic coating by adding nanoparticles to a resin has advantages of simplicity, high efficiency, low cost, etc. Commonly used nanoparticles include graphene, ZnO nanorods, and nano-$TiO_2$. Composite coatings based on such materials, however, have problems of high cost and low preparation efficiency. Therefore, in practical application, it is necessary to replace the above materials with cheaper materials. Nano-silicon dioxide ($SiO_2$) is a kind of commonly used cheap nanoparticles for preparing a superhydrophobic coating. In existing methods for preparing a composite coating with nano-$SiO_2$, silicone rubber, vulcanized rubber or other rubber is added to improve the abrasion resistance of the coating. After the addition of rubber, the nano-$SiO_2$ exhibits a poor compatibility with organic matter and low adhesion because the nano-$SiO_2$ surface with hydroxyl groups is easy to absorb water and aggregate, resulting in the quick loss of superhydrophobicity on the abraded coating. Furthermore, there are some experiments that improve the adhesion between a coating and a substrate by using a bicontinuous phase emulsion method/two-phase separation method or in combination with other polymers. However, such methods require a large quantity of organic solvents, and will produce a large amount of pollution gas, leading to a severe pollution to the environment, and are high in cost. Therefore, it is urgently necessary to develop a new preparation technique of a superhydrophobic coating based on $SiO_2$ to improve the abrasion resistance and practicability of the coating.

SUMMARY

An objective of the present disclosure is to provide a superhydrophobic coating with abrasion resistance and a preparation method thereof. In the present disclosure, cheap nano-$SiO_2$ and multi-walled carbon nanotubes are selected to form a nanohybrid, a micro-/nano-structure is formed on the surface of the coating to achieve superhydrophobicity, and the abrasion resistance of the coating is improved by winding-locked nano-$SiO_2$ and multi-walled carbon nanotubes. As a result, a superhydrophobic coating with excellent abrasion resistance could be obtained.

To achieve the above objective, the present disclosure provides the following technical solutions:

A superhydrophobic coating with abrasion resistance, having a composite structure formed by a nanohybrid composed of nano-$SiO_2$ and multi-walled carbon nanotubes, and a resin as a matrix.

In some embodiments, the nanohybrid composed of nano-$SiO_2$ and multi-walled carbon nanotubes account for 20-30% by mass of the resin.

In some embodiments, the resin is one selected from the group consisting of epoxy resin, polyurethane, unsaturated polyester resin, and acrylic resin.

In some embodiments, the superhydrophobic coating has a thickness of 40 μm to 120 μm.

In some embodiments, the nano-$SiO_2$ has a particle size of 20 nm to 200 nm, and the multi-walled carbon nanotubes have a diameter of 10 nm to 50 nm.

A method for preparing the superhydrophobic coating with abrasion resistance described above, including the following steps:

(1) modifying multi-walled carbon nanotubes to obtain multi-walled carbon nanotubes with amino groups on a surface thereof, modifying nano-$SiO_2$ to obtain nano-$SiO_2$ with epoxy groups on a surface thereof, and mixing the multi-walled carbon nanotubes with amino groups on the surface thereof and the nano-$SiO_2$ with epoxy groups on the surface thereof in acetone, to prepare a nanohybrid composed of the nano-$SiO_2$ and the multi-walled carbon nanotubes;

(2) uniformly dispersing the nanohybrid prepared in step (1) in acetone, and then uniformly mixing with a resin to form a homogeneous liquid, which is a hybrid-resin composite solution; and (3) uniformly spraying the hybrid-resin composite solution on a surface of a substrate, and curing at a temperature of 40-80° C. for 12-24 h to obtain the superhydrophobic coating with excellent abrasion resistance.

In some embodiments, in step (1), modifying multi-walled carbon nanotubes to obtain multi-walled carbon nanotubes with amino groups on the surface thereof is conducted as follows:

uniformly dispersing the multi-walled carbon nanotubes in a mixed solution of hydrochloric acid and nitric acid in a concentration ratio of 1:1, refluxing to obtain a carboxylated surface, and grafting 0.5-1.5% by mass of silane coupling agent KH550 onto the carboxylated surface.

In some embodiments, in step (1), modifying nano-$SiO_2$ to obtain nano-$SiO_2$ with epoxy groups on the surface thereof is conducted as follows:

modifying the nano-$SiO_2$ by using 0.5-1.5% by mass of silane coupling agent KH560.

In some embodiments, in step (1), mixing the multi-walled carbon nanotubes with amino groups on the surface thereof and the nano-$SiO_2$ with epoxy groups on the surface thereof in acetone is conducted by magnetic stirring for 64-80 h with a mass ratio of the multi-walled carbon nanotubes to the nano-$SiO_2$ ranging from 1:1 to 5:1, to obtain the nanohybrid composed of nano-$SiO_2$ and multi-walled carbon nanotubes.

The present disclosure has the following advantages and significant technical effects:

A superhydrophobic coating with excellent abrasion resistance is prepared by the following steps: preparing nanohybrid composed of nano-$SiO_2$ and multi-walled carbon nanotubes, mixing the nanohybrid with a resin to form a homogeneous liquid, which is a hybrid-resin composite solution, and uniformly spraying the hybrid-resin composite solution on a surface of a substrate to obtain the superhydrophobic coating with abrasion resistance. The micro-/nano-structure on the surface of the hybrid-resin composite coating (i.e., superhydrophobic coating) could improve the surface roughness of the coating, which is beneficial to achieving superhydrophobicity. An air film formed between the coating and the liquid makes it possible to reduce the contact area of a corrosive medium with the surface of the coating, thus preventing a metal substrate from corrosion. Furthermore, the hybrid-resin composite coating has excellent abrasion resistance. In case of abrasion on the surface of the coating, winding-locked hybrids endow the surface of the coating with excellent peeling resistance and allow the coating to maintain the superhydrophobicity. The hybrid-resin composite coating with abrasion resistance has the advantages of simple preparation, low cost, excellent abrasion resistance and superhydrophobicity, and thus has broad application prospects.

DETAILED DESCRIPTION OF THE EMBODIMENTS

The present disclosure is further described below in conjunction with examples and the accompanying drawings. The following examples are illustrative rather than limiting, and the protection scope of the present disclosure cannot be limited by the following examples.

Example 1

Step 1: A stainless steel sheet was sanded with a sandpaper, ultrasonically cleaned with acetone, alcohol and deionized water in sequence, and dried with cold air.

Step 2: Multi-walled carbon nanotubes with a diameter of 10 nm were dispersed in a mixed solution of hydrochloric acid and nitric acid in a concentration ratio of 1:1, and the resulting mixture was refluxed at 80° C. for 12 h, obtaining a carboxylated surface. 0.5% of silane coupling agent KH550 was then added thereto and the resulting mixture was kept at a temperature of 80° C. and stirred at a rate of 300 rpm for 24 h, obtaining modified multi-walled carbon nanotubes. The modified multi-walled carbon nanotubes were cleaned three times respectively with toluene and deionized water in sequence, and dried in vacuum, obtaining multi-walled carbon nanotubes with amino groups on the surface thereof.

Step 3: 0.5% of silane coupling agent KH560 was added to 20 mL of deionized water and the resulting mixture was magnetically stirred at a rate of 300 rpm for 30 min to fully hydrolyze the silane coupling agent KH560. Nano-$SiO_2$ with a particle size of 20 nm was added thereto, and subjected to an ultrasonic treatment at ambient temperature for 2 h, and dried at 60° C. for 24 h, obtaining nano-$SiO_2$ with epoxy groups on the surface thereof.

Step 4: The nano-$SiO_2$ with epoxy groups on the surface thereof and the multi-walled carbon nanotubes with amino groups on the surface thereof were added to acetone in a ratio of 1:1, stirred at a rate of 600 rpm at ambient temperature for 64 h, cleaned by suction filtration with deionized water for three times, and dried at 80° C., obtaining nanohybrid composed of nano-$SiO_2$ and multi-walled carbon nanotubes.

Step 5: 0.4 g of the nanohybrid were dispersed in acetone and magnetically stirred at a rate of 600 rpm for 30 min, obtaining a nanohybrid-containing solution.

Step 6: 2 g of epoxy resin was dissolved in the nanohybrid-containing solution by stirring at a rate of 300 rpm at ambient temperature, obtaining a homogeneous solution, which is a hybrid-resin composite solution.

Step 7: The hybrid-resin composite solution was sprayed on a surface of the stainless steel sheet, obtaining a wet coating.

Step 8: The wet coating was cured and dried at 40° C. for 24 h, obtaining a cured coating (i.e., hybrid-resin composite coating) with a thickness of 40 μm.

Figure 1A:
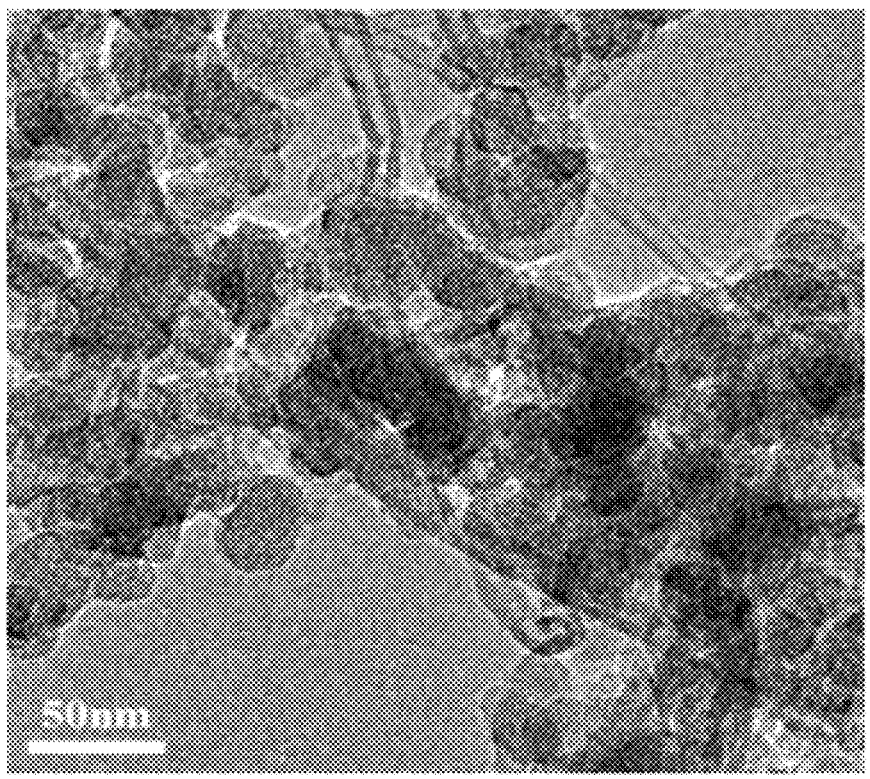
FIG. 1a is a transmission electron microscope image of the nanohybrid composed of nano-$SiO_2$ and multi-walled carbon nanotubes prepared in Example 1.
Figure 1B:
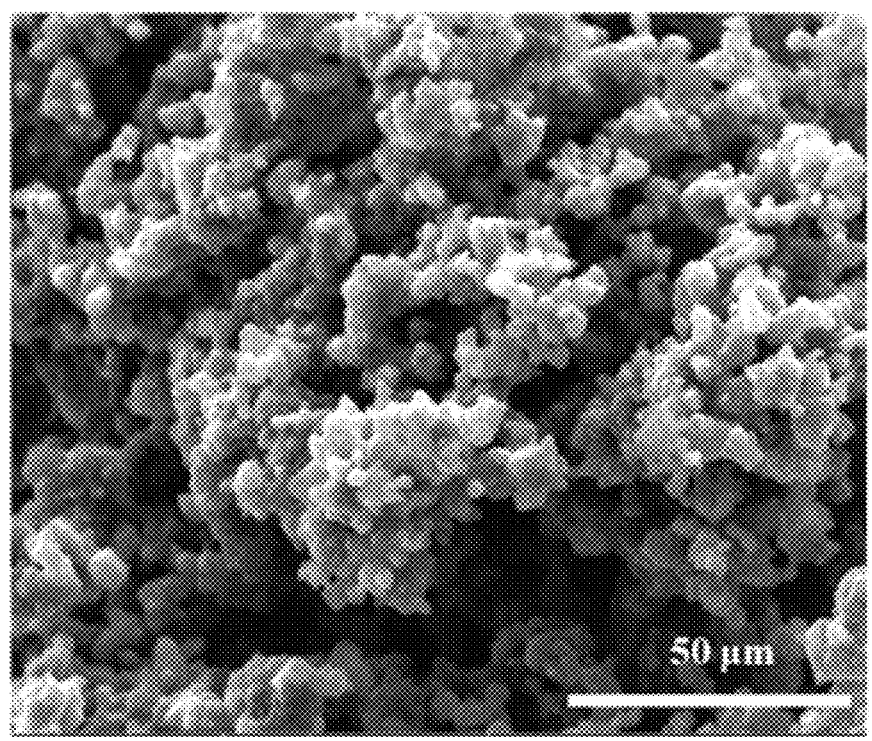
FIG. 1b is a scanning electron microscope image of the hybrid-resin composite coating prepared in Example 1.
Figure 1C:
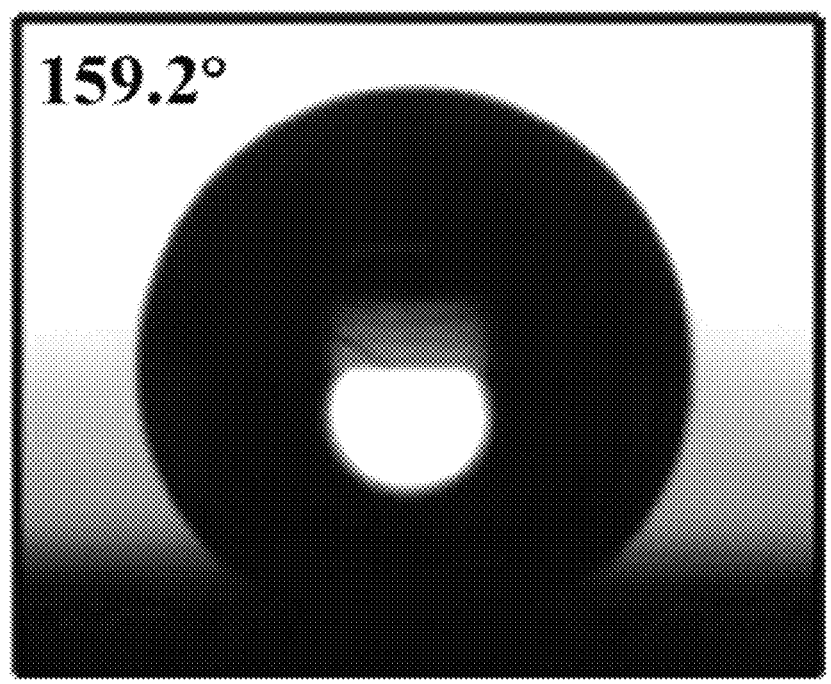
FIG. 1c is an image showing a water contact angle on the hybrid-resin composite coating prepared in Example 1.

FIG. 1a is a transmission electron microscope image of the nanohybrid composed of nano-$SiO_2$ and multi-walled carbon nanotubes prepared in Example 1; FIG. 1b is a scanning electron microscope image of the surface of the hybrid-resin composite coating prepared in Example 1; and FIG. 1c is an image showing a water contact angle on the hybrid-resin composite coating prepared in Example 1. The nano-$SiO_2$ with epoxy groups on the surface thereof and multi-walled carbon nanotubes with amino groups on the surface thereof were linked by chemical bonds, forming aggregates of micro-/nano-structure on the surface of the coating. The water contact angle on the composite coating reaches 159.2°.

Example 2

Step 1: An aluminum sheet was sanded with sandpaper, ultrasonically cleaned with acetone, alcohol and deionized water in sequence, and dried with cold air.

Step 2: Multi-walled carbon nanotubes with a diameter of 30 nm were dispersed in a mixed solution of hydrochloric acid and nitric acid, and the resulting mixture was refluxed at 80° C. for 12 h, obtaining a carboxylated surface. 1.0% of silane coupling agent KH550 was then added thereto and the resulting mixture was kept at a temperature of 80° C. and stirred at a rate of 300 rpm for 24 h, obtaining modified multi-walled carbon nanotubes. The modified multi-walled carbon nanotubes were cleaned three times respectively with toluene and deionized water in sequence, and dried in vacuum, obtaining multi-walled carbon nanotubes with amino groups on the surface thereof.

Step 3: 1.0% of silane coupling agent KH560 was added to 20 mL of deionized water and the resulting mixture was magnetically stirred at a rate of 300 rpm for 30 min to fully hydrolyze the silane coupling agent KH560. Nano-$SiO_2$ with a particle size of 100 nm was added thereto, and subjected to an ultrasonic treatment at ambient temperature for 2 h, and dried at 60° C. for 24 h, obtaining nano-$SiO_2$ with epoxy groups on the surface thereof.

Step 4: The nano-$SiO_2$ with epoxy groups on the surface thereof and the multi-walled carbon nanotubes with amino groups on the surface thereof were added to acetone in a ratio of 3:1, stirred at a rate of 600 rpm at ambient temperature for 70 h, cleaned by suction filtration with deionized water for three times, and dried at 80° C., obtaining nanohybrid composed of nano-$SiO_2$ and multi-walled carbon nanotubes.

Step 5: 0.75 g of nanohybrid were dispersed in acetone and magnetically stirred at a rate of 600 rpm for 30 min, obtaining a nanohybrid-containing solution.

Step 6: 3 g of polyurethane was dissolved in the nanohybrid-containing solution by stirring at a rate of 300 rpm at ambient temperature, obtaining a homogeneous solution, which is a hybrid-resin composite solution.

Step 7: The hybrid-resin composite solution was sprayed on a surface of the aluminum sheet, obtaining a wet coating.

Step 8: The wet coating was cured and dried at 60° C. for 18 h, obtaining a cured coating (i.e., hybrid-resin composite coating) with a thickness of 80 μm.

Step 9: The surface of the hybrid-resin composite coating was repeatedly stuck for 200 times using a 3M adhesive tape.

Figure 2A:
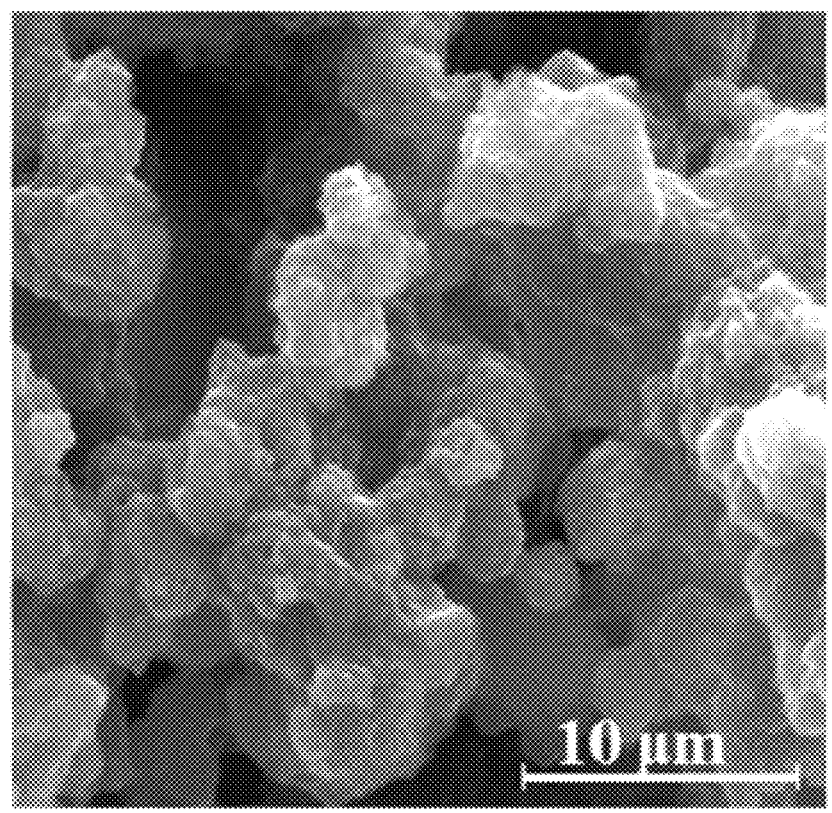
FIG. 2a is a scanning electron microscope image of the hybrid-resin composite coating prepared in Example 2 before being stuck.
Figure 2B:
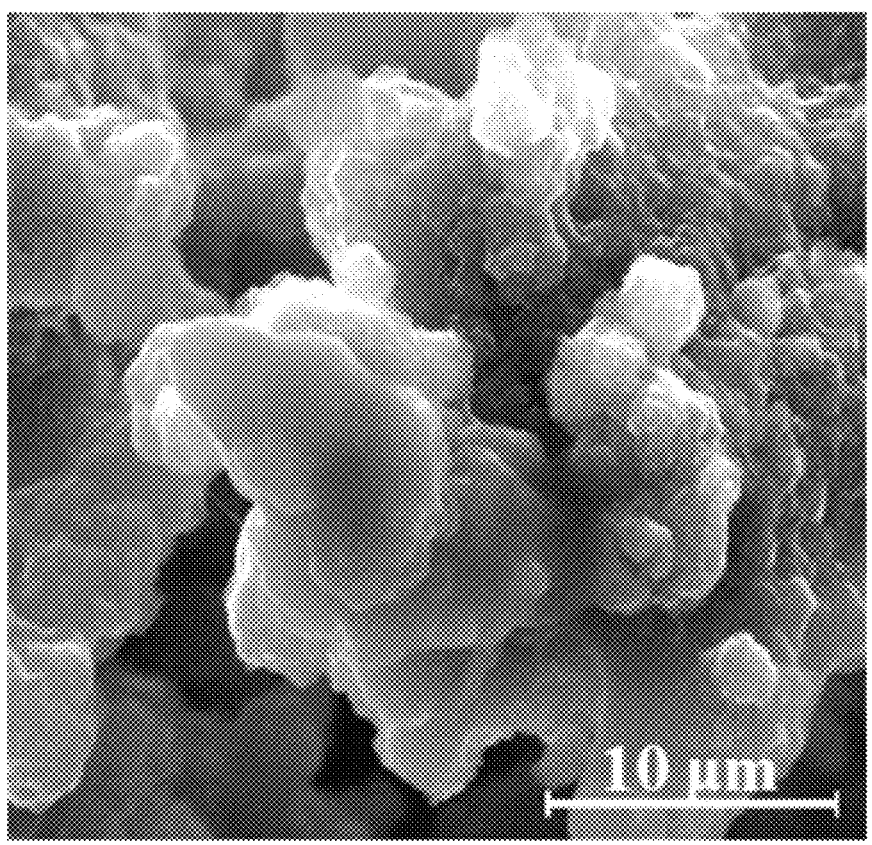
FIG. 2b is a scanning electron microscope image of the hybrid-resin composite coating prepared in Example 2 after being stuck.

FIG. 2a is a scanning electron microscope image of the surface of the hybrid-resin composite coating prepared in Example 2 before being stuck; and FIG. 2b is a scanning electron microscope image of the surface of the hybrid-resin composite coating prepared in Example 2 after being stuck for 200 times. The micro-/nano-structure on the surface of the hybrid-resin composite coating improves the surface roughness of the coating, and winding-locked hybrids endow the surface of the coating with excellent peeling resistance. Thus, even being repeatedly stuck for 200 times, the surface of the coating still maintains layered micro-/nano-structure, which is beneficial to maintaining the superhydrophobicity.

Example 3

Step 1: A low-alloy steel was sanded with sandpaper, ultrasonically cleaned with acetone, alcohol and deionized water in sequence, and dried with cold air.

Step 2: Multi-walled carbon nanotubes with a diameter of 50 nm were dispersed in a mixed solution of hydrochloric acid and nitric acid, and the resulting mixture was refluxed at 80° C. for 12 h, obtaining a carboxylated surface. 1.5% of silane coupling agent KH550 was then added thereto and the resulting mixture was kept at a temperature of 80° C., and stirred at a rate of 300 rpm for 24 h, obtaining modified multi-walled carbon nanotubes. The modified multi-walled carbon nanotubes were cleaned three times respectively with toluene and deionized water in sequence, and dried in vacuum, obtaining multi-walled carbon nanotubes with amino groups on the surface thereof.

Step 3: 1.5% of silane coupling agent KH560 was added to 20 mL of deionized water and the resulting mixture was magnetically stirred at a rate of 300 rpm for 30 min to fully hydrolyzee the silane coupling agent KH560. Nano-$SiO_2$ with a particle size of 200 nm was added thereto, and subjected to an ultrasonic treatment at ambient temperature for 2 h, and dried at 60° C. for 24 h, obtaining nano-$SiO_2$ with epoxy groups on the surface thereof.

Step 4: The nano-$SiO_2$ with epoxy groups on the surface thereof and the multi-walled carbon nanotubes with amino groups on the surface thereof were added to acetone in a ratio of 5:1, stirred at a rate of 600 rpm at ambient temperature for 80 h, cleaned by suction filtration with deionized water for three times, and dried at 80° C., obtaining nanohybrid composed of nano-$SiO_2$ and multi-walled carbon nanotubes.

Step 5: 0.6 g of nanohybrid were dispersed in acetone and magnetically stirred at a rate of 600 rpm for 30 min, obtaining a nanohybrid-containing solution.

Step 6: 2 g of acrylic resin was dissolved in the nanohybrid-containing solution by stirring at a rate of 300 rpm at ambient temperature, obtaining a homogeneous solution, which is a hybrid-resin composite solution.

Step 7: The hybrid-resin composite solution was sprayed on a surface of the low-alloy steel, obtaining a wet coating.

Step 8: The wet coating was cured and dried at 80° C. for 12 h, obtaining a cured coating (i.e., hybrid-resin composite coating) with a thickness of 120 μm.

Step 9: The surface of the hybrid-resin composite coating was repeatedly stuck with a 3M adhesive tape until the water contact angle on the coating was below 150°, during which the water contact angle on the coating was measured every 10 times of being stuck.

Figure 3:
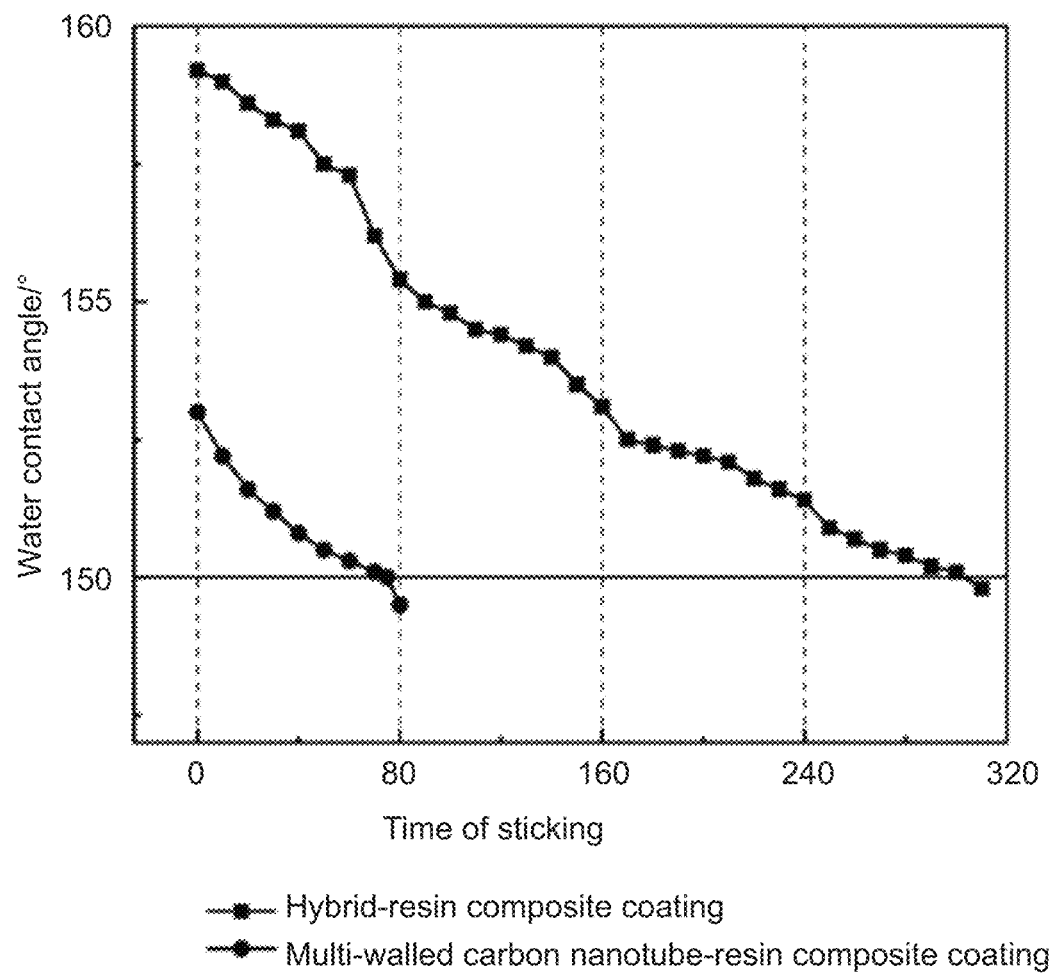
FIG. 3 is a curve chart showing a variation curve of the water contact angle on the surface of a hybrid-resin composite coating prepared in Example 3 after being repeatedly stuck, and a variation curve of the water contact angle on the surface of a multi-walled carbon nanotube-resin composite coating after being repeatedly stuck.

FIG. 3 is a curve chart showing a variation curve of the water contact angle on the surface of the hybrid-resin composite coating prepared in Example 3 after being repeatedly stuck, and a variation curve of the water contact angle on the surface of a multi-walled carbon nanotube-resin composite coating after being repeatedly stuck. After being repeatedly stuck for 300 times, the water contact angle on the hybrid-resin composite coating was still kept at 150°. This is due to the fact that the winding-locked effect of the nano-$SiO_2$ with epoxy groups on the surface thereof and multi-walled carbon nanotubes with amino groups on the surface thereof endowed the surface of the coating with excellent peeling resistance, and thus the coating was not easy to be damaged during friction. Regarding the multi-walled carbon nanotube-resin composite coating, the water contact angle was reduced to 150° after being repeatedly stuck for 80 times, which is due to the poor adhesion of the multi-walled carbon nanotubes to the surface of the coating and poor abrasion resistance of the coating. The above studies show that the winding-locked structure of nano-$SiO_2$ and multi-walled carbon nanotubes played a key role in improving the abrasion resistance of the coating.

What is claimed is:

1. A method for preparing a superhydrophobic coating with abrasion resistance, comprising the following steps:
    (1) modifying multi-walled carbon nanotubes to obtain multi-walled carbon nanotubes with amino groups on a surface thereof, modifying nano-$SiO_2$ to obtain nano-$SiO_2$ with epoxy groups on a surface thereof, and mixing the multi-walled carbon nanotubes with amino groups on the surface thereof and the nano-$SiO_2$ with epoxy groups on the surface thereof in acetone, to prepare nanohybrid composed of the nano-$SiO_2$ and the multi-walled carbon nanotubes;
    (2) uniformly dispersing the nanohybrid prepared in step (1) in acetone, and then uniformly mixing with a resin to form a homogeneous liquid, which is a hybrid-resin composite solution; and
    (3) uniformly spraying the hybrid-resin composite solution on a surface of a substrate, and curing at a temperature of 40-80° C. for 12-24 h to obtain the superhydrophobic coating with abrasion resistance;
    wherein the superhydrophobic coating with abrasion resistance has a composite structure formed by the nanohybrid composed of the nano-$SiO_2$ and the multi-walled carbon nanotubes, and the resin as a matrix; and
    wherein in step (1), mixing the multi-walled carbon nanotubes with amino groups on the surface thereof and the nano-$SiO_2$ with epoxy groups on the surface thereof in acetone is conducted by magnetic stirring for 64-80 h with a mass ratio of the multi-walled carbon nanotubes to the nano-$SiO_2$ ranging from 1:1 to 5:1, to obtain the nanohybrid composed of the nano-$SiO_2$ and the multi-walled carbon nanotubes.

\* \* \* \* \*